US008112676B2

(12) United States Patent
Bryan

(10) Patent No.: US 8,112,676 B2
(45) Date of Patent: Feb. 7, 2012

(54) APPARATUS AND METHOD TO GENERATE AND COLLECT DIAGNOSTIC DATA

(75) Inventor: Lourie A. Bryan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 12/391,149

(22) Filed: Feb. 23, 2009

(65) Prior Publication Data

US 2010/0218052 A1 Aug. 26, 2010

(51) Int. Cl.
*G06F 11/00* (2006.01)
(52) U.S. Cl. ............................. 714/46; 714/57
(58) Field of Classification Search .................. None
See application file for complete search history.

(56) References Cited

U.S. PATENT DOCUMENTS

| | | | | |
|---|---|---|---|---|
| 5,944,839 A | * | 8/1999 | Isenberg | 714/26 |
| 5,983,364 A | * | 11/1999 | Bortcosh et al. | 714/25 |
| 6,202,085 B1 | | 3/2001 | Benson et al. | |
| 6,338,152 B1 | * | 1/2002 | Fera et al. | 714/48 |
| 6,341,326 B1 | | 1/2002 | Zhao et al. | |
| 6,357,017 B1 | * | 3/2002 | Bereiter et al. | 714/27 |
| 6,615,090 B1 | * | 9/2003 | Blevins et al. | 700/26 |
| 6,654,914 B1 | * | 11/2003 | Kaffine et al. | 714/43 |
| 6,856,996 B2 | | 2/2005 | Chow et al. | |
| 7,120,819 B1 | * | 10/2006 | Gurer et al. | 714/4.2 |
| 7,840,856 B2 | * | 11/2010 | Apte et al. | 714/48 |
| 2003/0088666 A1 | | 5/2003 | Engel | |
| 2003/0236877 A1 | * | 12/2003 | Allan | 709/224 |
| 2004/0015742 A1 | * | 1/2004 | Olson | 714/42 |
| 2005/0102567 A1 | * | 5/2005 | McGuire et al. | 714/25 |
| 2005/0149363 A1 | | 7/2005 | Loiterman et al. | |
| 2007/0005542 A1 | * | 1/2007 | Echeverria et al. | 706/47 |
| 2010/0138703 A1 | * | 6/2010 | Bansal et al. | 714/57 |

FOREIGN PATENT DOCUMENTS

| | | | |
|---|---|---|---|
| JP | 358195974 A | * | 11/1983 |
| JP | 2005151043 | | 9/2005 |

OTHER PUBLICATIONS

Bruckner, R. et al., "Capturing Delays and Valid Times in Data Warehouses—Towards Timely Consistent Analyses,", Journal of Intelligent Information Systems, Sep. 2002, vol. 19, No. 2, pp. 169-190, Kluwer Academic Publishers, The Netherlands.
Cheng, W. et al., "A Coordinated Data Collection Approach: Design, Evaluation, Comparison Source." IEEE Journal on Selected Areas in Communications, Dec. 2004, vol. 22, No. 10.

* cited by examiner

*Primary Examiner* — Gabriel Chu
(74) *Attorney, Agent, or Firm* — Dale F. Regelman; Quarles & Brady LLP

(57) ABSTRACT

A method to generate and save diagnostic data in the event of an application error, wherein the method supplies a first computing device comprising a microprocessor and a first computer readable medium and an application encoded in said computer readable medium, wherein said application comprises an error handling module. The method further supplies a second computing device comprising a microprocessor and a second computer readable medium and an error data management module encoded in said second computer readable medium, wherein said error data management module comprises a diagnostic data generating module, wherein said first computing device is in communication with said second computing device. The method executes the application, detects by the error handling module an application error, and detects by the error data management module the application error. The method then receives by the error handling module a completion signal from the error data management module, and provides an error signal from the error handling module to a support center.

15 Claims, 4 Drawing Sheets

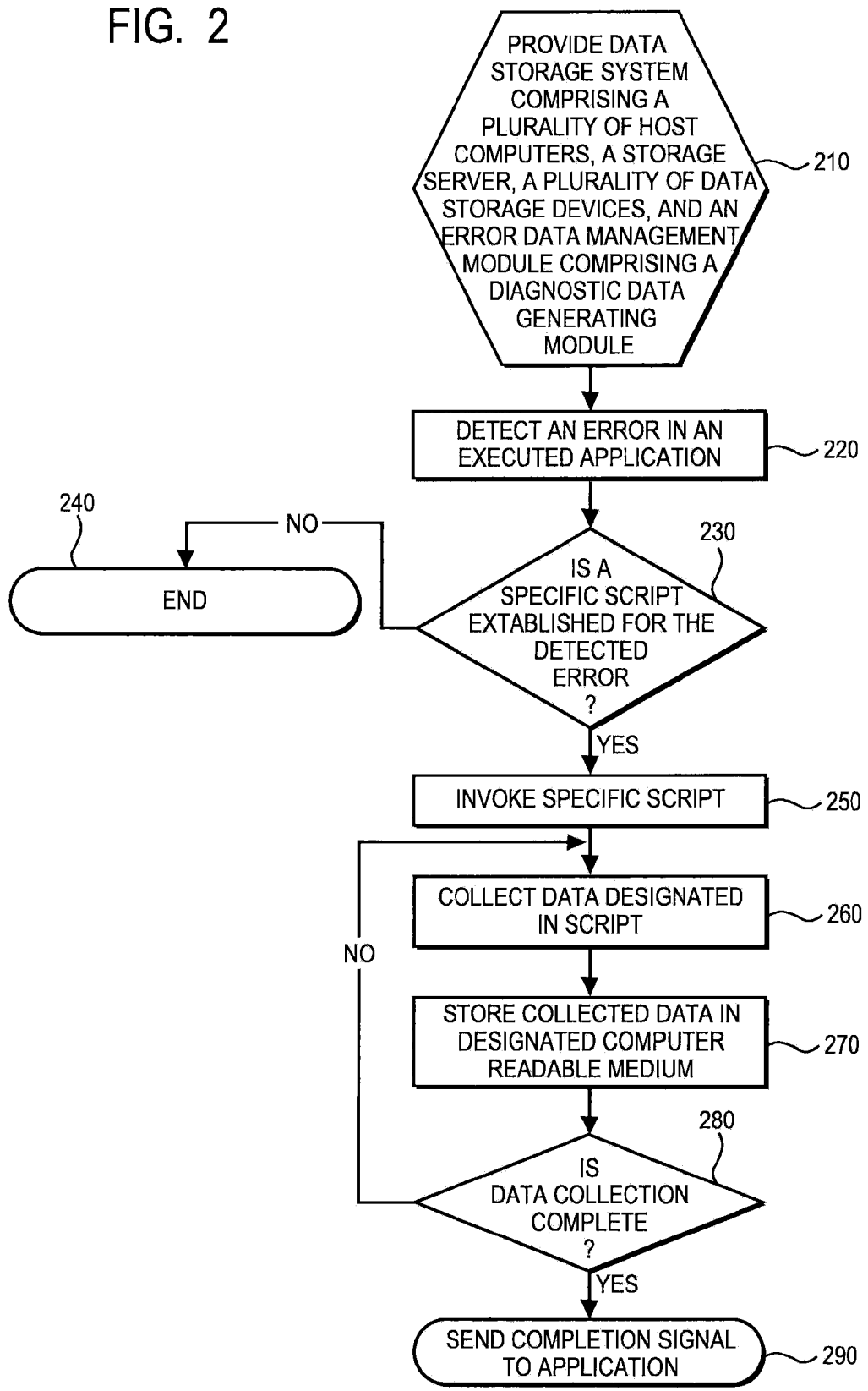

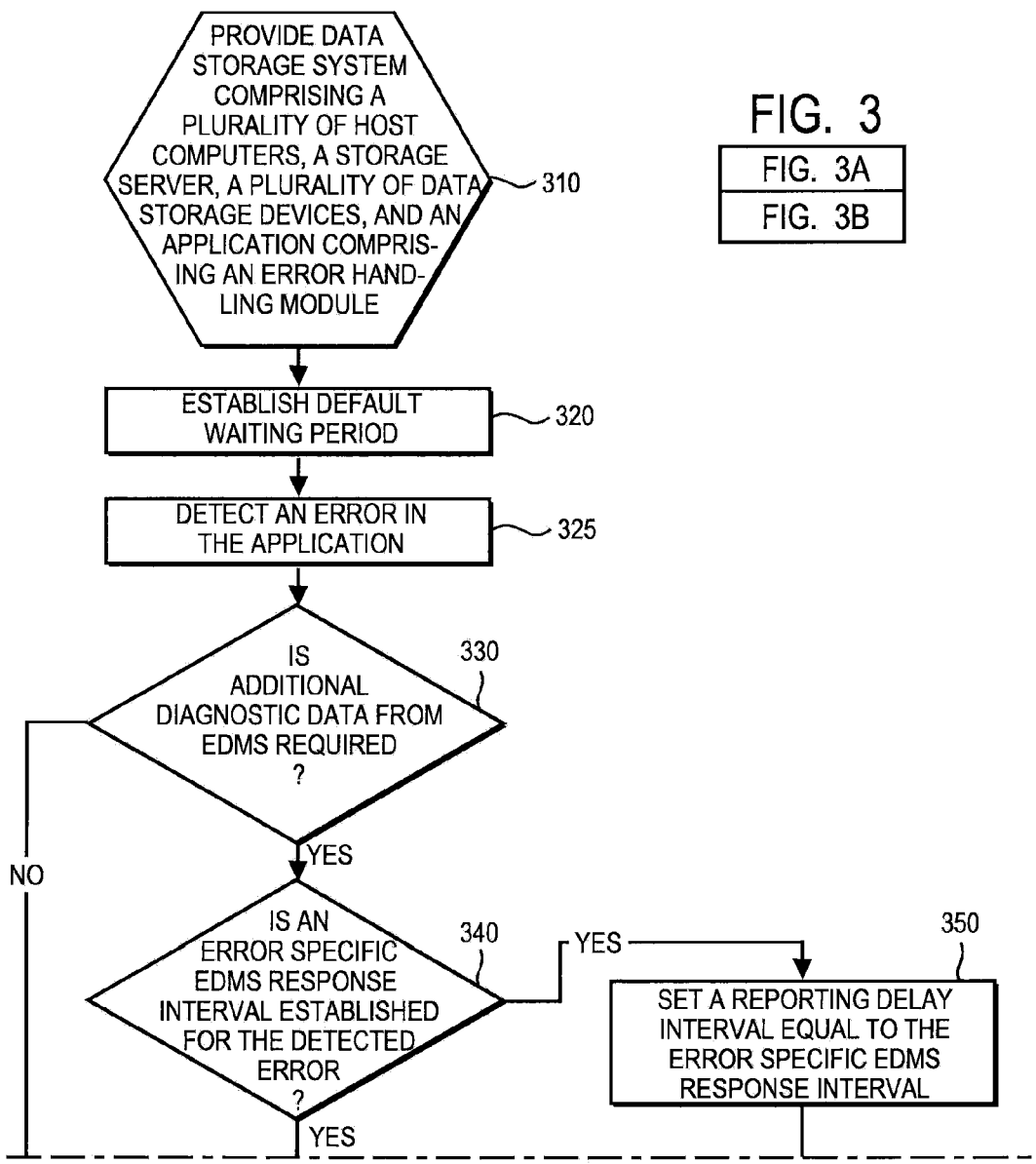

APPARATUS AND METHOD TO GENERATE AND COLLECT DIAGNOSTIC DATA

FIELD OF THE INVENTION

The invention relates to an apparatus and method to generate and collect diagnostic data in the event of an application error.

BACKGROUND OF THE INVENTION

Data storage systems are used to store information provided by one or more host computer systems to a storage server. Such storage servers receive requests to write information to one or more data storage devices, and requests to retrieve information from those one or more data storage devices.

Applications resident on one or more of the host computers, and/or applications resident on a storage server facilitate the flow of data to and from the storage server, and to and from a plurality of data storage devices.

SUMMARY OF THE INVENTION

The invention comprises an apparatus and method to generate and save diagnostic data in the event of an application error. The method supplies a first computing device comprising a microprocessor and a first computer readable medium and an application encoded in the computer readable medium, wherein the application comprises an error handling module. The method further supplies a second computing device comprising a microprocessor and a second computer readable medium and an error data management module encoded in the second computer readable medium, wherein the error data management module comprises a diagnostic data generating module, wherein the first computing device is in communication with the second computing device.

In certain embodiments, the first computing device is the same as the second computing device, and the first computer readable medium is the same as the second computer readable medium. In certain embodiments, the first computing device comprises a host computer. In certain embodiments, the second computing device comprises a storage server.

The method executes the application, detects by the error handling module an application error, and detects by the error data management module the application error. The method then receives by the error handling module a completion signal from the error data management module, and provides an error signal from the error handling module to a support center.

BRIEF DESCRIPTION OF THE DRAWINGS

The invention will be better understood from a reading of the following detailed description taken in conjunction with the drawings in which like reference designators are used to designate like elements, and in which:

FIG. 2 summarizing certain steps of Applicant's method;

FIG. 3A summarizing certain steps of Applicant's method; and

DETAILED DESCRIPTION OF THE PREFERRED EMBODIMENTS

Figure 1:
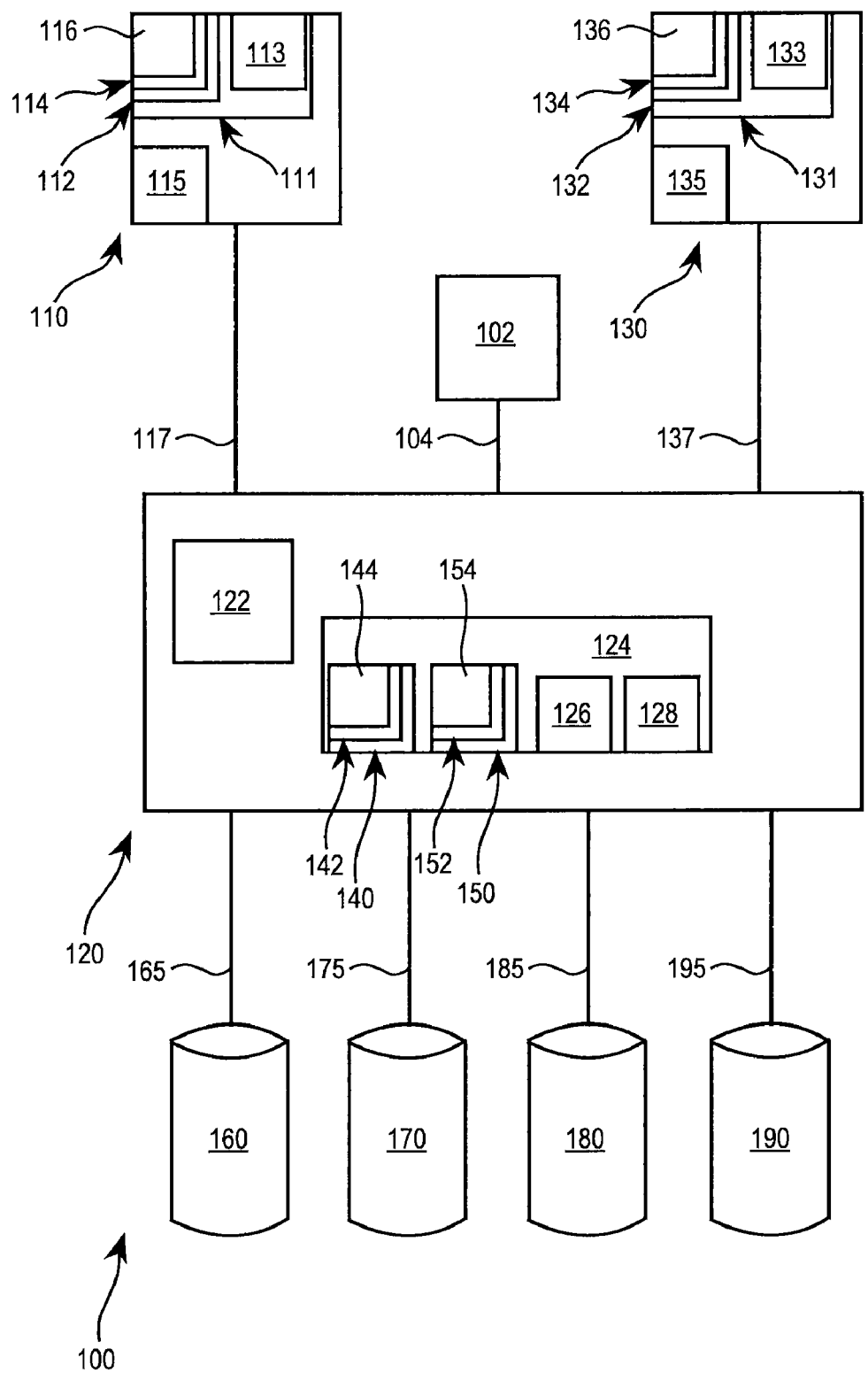
FIG. 1 is a block diagram showing one embodiment of Applicant's data processing system.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The invention is described herein in the context of a data storage system. This description should not be interpreted to limit the invention described and claimed herein to data storage systems. Rather, Applicant's invention can be implemented in a single computing device, or in two computing devices that remain in communication with one another.

Many of the functional units described in this specification have been labeled as modules (e.g., modules 112, 132, 140, and 150) in order to more particularly emphasize their implementation independence. For example, a module (e.g., modules 112, 132, 140, and 150) may be implemented as a hardware circuit comprising custom VLSI circuits or gate arrays, semiconductors such as logic chips, transistors, or other discrete components. A module (e.g., 112, 132, 140, and 150) may also be implemented in programmable hardware devices such as field programmable gate arrays, programmable array logic, programmable logic devices, or the like.

Modules (e.g., modules 112, 132, 140, and 150) may also be implemented in software for execution by various types of processors. An identified module of executable code may, for instance, comprise one or more physical or logical blocks of computer instructions which may, for instance, be organized as an object, procedure, or function. Nevertheless, the executables of an identified module (e.g., modules 112, 132, 140, and 150) need not be physically collocated, but may comprise disparate instructions stored in different locations which, when joined logically together, comprise the module and achieve the stated purpose for the module.

Indeed, a module of executable code (e.g., modules 112, 132, 140, and 150) may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams included are generally set forth as logical flow-chart diagrams (e.g., FIGS. 2 and 3). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 2 and 3). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates one embodiment of Applicant's data processing system 100. In the illustrated embodiment of FIG. 1, data processing system 100 comprises storage server 120, host computers 110 and 130 in communication with storage server 120, and a plurality of data storage devices 160, 170, 180, and 190, in communication with storage server 120. In the illustrated embodiment of FIG. 1, storage server 120 is in communication with service center 102 via communication link 104.

Further in the illustrated embodiment of FIG. 1, storage server 120 comprises a microprocessor 122, a computer readable medium 124, an Application 140 encoded in computer readable medium 124, and an error data management module 150 encoded in computer readable medium 124.

Further in the illustrated embodiment of FIG. 1, Application 140 comprises an error handling module 142. Further in the illustrated embodiment of FIG. 1, error handling module 142 comprises a database/lookup table 144, wherein that database/lookup table 144 associates each of a plurality of different Application error conditions with a specific error data management module response interval.

Further in the illustrated embodiment of FIG. 1, error data management module 150 comprises a diagnostic data generating module 152. Further in the illustrated embodiment of FIG. 1, diagnostic data generating module 152 comprises a database/lookup table 154, wherein database/lookup table 154 associates each of plurality of different Application error conditions with a specific data collection script.

As a general matter, host computers 110 and 130 each comprises a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 110 and 130 further includes a storage management program 113/133. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, host computers 110 and 130 comprise a microprocessor 115 and 135, respectively, a computer readable medium 111 and 131, respectively, and an application 112 and 132, respectively encoded in computer readable medium 111 and 131, respectively.

In the illustrated embodiment of FIG. 1, Application 112/132 comprise an error handling module 114/134, respectively. Further in the illustrated embodiment of FIG. 1, error handling module 114/134 comprise a diagnostic data generating module 116/136, respectively.

Host computers 110 and 130 communicate with storage server 120 via communication links 117 and 127, respectively, using any known I/O interface. In certain embodiments, communication links 117 and 127 utilize one or more of the following I/O interfaces, ESCON, FICON, Fibre Channel, INFINIBAND, Gigabit Ethernet, Ethernet, TCP/IP, iSCSI, SCSI I/O interface, and the like.

Storage server 120 communicates with data storage devices using communication links 165, 175, 185, and 195, respectively using any known I/O interface. In certain embodiments, communication links 165, 175, 185, and 195, utilize one or more of the following I/O interfaces ESCON, FICON, Fibre Channel, INFINIBAND, Gigabit Ethernet, Ethernet, TCP/IP, iSCSI, SCSI I/O interface, and the like.

In certain embodiments, one or more of data storage devices 160, 170, 180, and/or 190, comprises a magnetic storage medium in combination with hardware, firmware, and software, needed to write information to, and read information from, that magnetic storage medium. In certain embodiments, storage server 120 comprises a virtual tape server and one or more of data storage devices 160, 170, 180, and/or 190, comprises a magnetic tape storage medium in combination with hardware, firmware, and software, needed to write information to, and read information from, that magnetic tape storage medium.

In certain embodiments, one or more of data storage devices 160, 170, 180, and/or 190, comprises an optical storage medium in combination with hardware, firmware, and software, needed to write information to, and read information from, that optical storage medium. In certain embodiments, one or more of data storage devices 160, 170, 180, and/or 190, comprises an electronic storage medium in combination with hardware, firmware, and software, needed to write information to, and read information from, that electronic storage medium. In certain embodiments, one or more of data storage devices 160, 170, 180, and/or 190, comprises a holographic storage medium in combination with hardware, firmware, and software, needed to write information to, and read information from, that holographic storage medium.

Applicant's method provides a mechanism to generate diagnostic data when an error occurs in an application, such as for example and without limitation application 112 (FIG. 1) and/or application 140 (FIG. 1). Applicant's error data management module 150 (FIG. 1) comprises a diagnostic data generating module 152 (FIG. 1). Diagnostic data generating module 152 comprises a database/lookup table 154, wherein that database/lookup table associates each of a plurality of application error conditions with a specific data gathering script. Each data gathering script comprises instructions regarding data to be dumped and/or collected if a specific error condition is detected in the application.

Figure 3B:
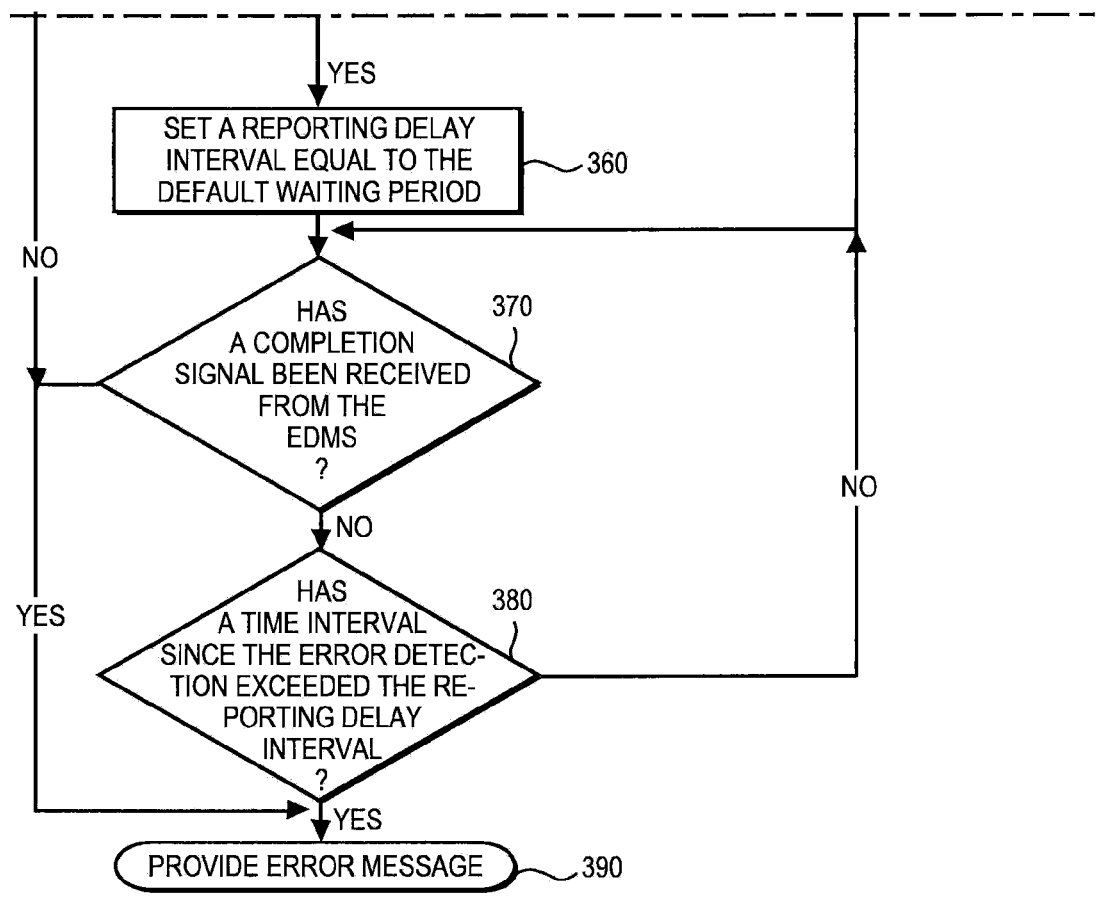
FIG. 3B summarizing certain additional steps of Applicant's method.

FIGS. 2 and 3 summarize Applicant's method to generate and store diagnostic data in the event of an application error. FIG. 2 summarizes portions of Applicant's method implemented by Applicant's error data management module. FIGS. 3A and 3B summarizes portion of Applicant's method implemented by an error handling module resident in the application itself.

Referring now to FIG. 2, in step 210 the method provides a data storage system comprising a plurality of host computers, a storage server in communication with each of the host computers, a plurality of data storage devices in communication with the storage server, and Applicant's error data management module, such a error data management module 150 (FIG. 2).

In step 220, the method detects an error in an executed application. In certain embodiments, step 220 is performed by Applicant's error data management module. In certain embodiments, step 220 is performed by a diagnostic data generating module portion of Applicant's error data management module. In certain embodiments, Applicant's error data management module is encoded in a computer readable medium disposed in the storage server of step 210. In certain embodiments, the application is running on the storage server of step 210. In certain embodiments, the application is running on a host computer in communication with the storage server of step 210.

In step 230, the method determines if a specific data gathering script is associated with the error condition detected in step 220. In certain embodiments, the diagnostic data generating module portion of Applicant's error data management module comprises a plurality of data gathering scripts, wherein each of those data gathering scripts is associated with a specific error condition. In certain embodiments, step 230 is performed by Applicant's error data management module. In certain embodiments, step 230 is performed by a diagnostic data generating module portion of Applicant's error data management module.

If the method determines in step 230 that a specific data gathering script is not associated with the error condition detected in step 220, then the method with respect to Applicant's error data management module transitions from step 230 to step 240 and ends. Alternatively, if the method in step 230 determines that a specific data gathering script is associated with the error condition detected in step 220, then the method transitions from step 230 to step 250 wherein the method invokes the specific data gathering script associated with the detected error of step 220. In certain embodiments, step 250 is performed by Applicant's error data management module. In certain embodiments, step 250 is performed by a diagnostic data generating module portion of Applicant's error data management module.

In step 260, the method, using the executed data gathering script of step 250, generates and/or collects data designated in that data gathering script. In certain embodiments, step 260 is performed by Applicant's error data management module. In certain embodiments, step 260 is performed by a diagnostic data generating module portion of Applicant's error data management module.

In step 270, the method saves the data generated and/or collected in step 260 to a designated location 128 (FIG. 1) in a computer readable medium. In certain the method saves the data generated and/or collected in step 260 to a storage location designated by the data collection script of step 250. In certain embodiments, step 270 is performed by Applicant's error data management module. In certain embodiments, step 270 is performed by a diagnostic data generating module portion of Applicant's error data management module.

In step 280, the method determines if diagnostic data generation/collection is complete. In certain embodiments, step 280 is performed by Applicant's error data management module. In certain embodiments, step 280 is performed by a diagnostic data generating module portion of Applicant's error data management module.

If the method determines in step 280 that diagnostic data generation/collection is not complete, the method transitions from step 280 to step 260 and continues as described herein. Alternatively, if the method determines in step 280 that diagnostic data generation/collection is complete, then the method transitions from step 280 to step 290 wherein the method send a Completion Signal to the application of step 220. In certain embodiments, step 290 is performed by Applicant's error data management module. In certain embodiments, step 290 is performed by a diagnostic data generating module portion of Applicant's error data management module.

Referring now to FIG. 3, in step 310 the method provides a data storage system comprising a plurality of host computes, a storage server, a plurality of data storage devices in communication with the storage server, and an application comprising an error handling module.

In step 320, the method establishes a default waiting period, wherein the method delays sending an error signal after detecting an application error for that default waiting period. In certain embodiments, the default waiting period of step 320 is established by the owner and/or operation of the storage server of step 310. In certain embodiments, the default waiting period of step 320 is established by the owner and/or operator of one or more of the host computers of step 310.

In step 325, the method detects an error in an executed application. In certain embodiments, the application of step 325 is running on the storage server of step 310. In certain embodiments, the application of step 325 is running on one or more host computers of step 310. In certain embodiments, step 325 is executed by an error handling module portion of the executed application.

In step 330, the method determines if additional diagnostic data from Applicant's error data management module ("EDMD") is required. In certain embodiments, step 330 is executed by an error handling module portion of the executed application. In certain embodiments, the error handling module portion of the executed application comprises a database/lookup table, wherein that database/lookup table indicates for each of a plurality of application error conditions whether additional diagnostic data generated and/or collected by Applicant's EDMD is required.

If the method determines in step 330 that additional diagnostic data generated and/or collected by Applicant's EDMD is not required, then the method transitions from step 330 to step 390 (FIG. 3B), and provides an error signal alerting service personnel about the application error. In certain embodiments, in step 390 (FIG. 3B) the method provides an error message to a service center, such as service center 102 using communication link 104. Providing such an error message is sometimes referred to as "calling home." In certain embodiments, the communication link 104 comprises a telephone link. In certain embodiments, communication link 104 utilizes an TCP/IP communication protocol.

Alternatively, if the method determines in step 330 that additional diagnostic data generated and/or collected by Applicant's EDMD is required, then the method transitions from step 330 to step 340 wherein the method determines if an error-specific EDMD response interval has been established for the application error detected in step 325. In certain embodiments, step 340 is executed by an error handling module portion of the executed application.

If the method determines in step 340 that an error-specific EDMD response interval has not been established for the application error detected in step 325, then the method transitions from step 340 to step 360 (FIG. 3B) wherein the method sets a reporting delay interval to the default waiting period of step 320. In certain embodiments, step 360 (FIG. 3B) is executed by an error handling module portion of the executed application. The method transitions from step 360 to step 370 (FIG. 3B).

Alternatively, if the method determines in step 340 that an error-specific EDMD response interval has been established for the application error detected in step 325, then the method transitions from step 340 to step 350 wherein the method sets a reporting delay interval to the error-specific EDMD response interval established for the application error detected in step 325. In certain embodiments, step 350 is executed by an error handling module portion of the executed application.

The method transitions from step 350 to step 370 (FIG. 3B) wherein the method determines if a completion signal has been received from Applicant's EDMD. In certain embodiments, step 370 (FIG. 3B) is executed by an error handling module portion of the executed application.

If the method determines in step 370 (FIG. 3B) that a completion signal has been received from Applicant's EDMD, then the method transitions from step 370 to step 390 (FIG. 3B) and continues as described herein. Alternatively, if the method determines in step 370 that a completion signal has not been received from Applicant's EDMD, then the method transitions from step 370 to step 380 (FIG. 3B) wherein the method determines if a time interval starting at the error detection of step 325 to the present exceeds the reporting delay interval of step 350 or step 360. In certain embodiments, step 380 (FIG. 3B) is executed by an error handling module portion of the executed application.

If the method determines in step 380 that a time interval starting at the error detection of step 325 to the present does not exceed the reporting delay interval of step 350 or step 360, then the method transitions from step 380 to step 370 and continues as described herein. Alternatively, if the method determines in step 380 that a time interval starting at the error detection of step 325 to the present does exceed the reporting delay interval of step 350 or step 360, then the method transitions from step 380 to step 390 and continues as described herein.

In certain embodiments, individual steps recited in FIGS. 2, 3A, and 3B may be combined, eliminated, or reordered.

In certain embodiments, Applicant's invention includes instructions, such as instructions 126 (FIG. 1) written to computer readable medium 124 (FIG. 1), where those instructions are executed by a microprocessor, such as microprocessor 122 (FIG. 1), to perform one or more of steps 220, 230, 240, 250, 260, 270, 280, and/or 290, recited in FIG. 2, and/or one or more of steps 320, 325, 330, 340, 350, 360, 370, 380, and/or 390, recited in FIGS. 3A and 3B.

In other embodiments, Applicant's invention includes instructions residing in any other computer program product, where those instructions are executed by a microprocessor external to, or internal to, data storage system 100, to perform one or more of steps 220, 230, 240, 250, 260, 270, 280, and/or 290, recited in FIG. 2, and/or one or more of steps 320, 325, 330, 340, 350, 360, 370, 380, and/or 390, recited in FIGS. 3A and 3B. In either case, the instructions may be encoded in a computer readable medium comprising, for example, a magnetic information storage medium, an optical information storage medium, an electronic information storage medium, and the like. By "electronic storage media," Applicant means, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to generate and save diagnostic data in the event of an application error, comprising:
supplying a first computing device comprising a first microprocessor and a first computer readable medium and an application encoded in said first computer readable medium, wherein said application comprises an error handling module;
supplying a second computing device comprising a second microprocessor and a second computer readable medium and an error data management module encoded in said second computer readable medium, wherein said error data management module comprises a diagnostic data generating module, wherein said first computing device is in communication with said second computing device;
executing said application;
detecting by said error handling module an application error;
detecting by said error data management module said application error;
receiving by said error handling module a completion signal from said error data management module;
providing an error signal by said error handling module;
determining if diagnostic data from said error data management module is required;
operative if diagnostic data from said error data management module is not required, providing said error signal even if said error handling module completion signal has not been received
wherein:
said first computing device and said second computing device comprise the same computing device;
said first computer readable medium and said second computer readable medium comprise the same computer readable medium;
said first microprocessor and said second microprocessor are the same microprocessor,
said first computing device comprises a storage server in communication with a plurality of data storage devices and in communication with a plurality of host computers;
said second computing device comprises said storage server.

2. The method of claim 1, further comprising:
establishing a default waiting period;
setting a reporting delay interval equal to said default waiting period;
determining if a time interval since detecting said error exceeds said reporting delay interval;
operative if a time interval since detecting said error exceeds said reporting delay interval, providing said error signal even if said error handling module completion signal has not been received.

3. The method of claim 2, wherein said error handling module comprises a database associating each of a plurality of application errors with a specific error data management module response interval, further comprising:
operative if said error handling database associates a specific error data management module response interval with said detected error, setting said reporting delay interval equal to said specific error data management module response interval.

4. The method of claim 1, wherein said diagnostic data generating module comprises a database associating each of a plurality of application errors with a specific data collection script, further comprising:
operative if said diagnostic data generating module database associates a specific data collection script with said detected error, invoking said specific data collection script;

gathering diagnostic data recited in said specific data collection script.

5. The method of claim 4, further comprising storing said gathered diagnostic data at storage location designated by said specific diagnostic data collection script.

6. The method of claim 5, further comprising:
determining if all the diagnostic data recited in said specific data collection script has been collected and saved;
operative if all the diagnostic data recited in said specific data collection script has been collected and saved, providing said completion signal to said error handling module.

7. A storage server comprising a microprocessor, a computer readable medium, an application comprising an error handling module and encoded in said computer readable medium, an error data management module encoded in said computer readable medium, and computer readable program code encoded in said computer readable medium to generate and save diagnostic data, wherein said storage server is in communication with a support center, the computer readable program code comprising a series of computer readable program steps to effect:
executing said application;
detecting an application error by said error handling module;
detecting an application error by said error data management module;
receiving a completion signal from said error data management module;
providing an error signal to said support center;
determining if diagnostic data from said error data management module is required;
operative if diagnostic data from said error data management module is not required, providing said error signal even if said error handling module completion signal has not been received.

8. The storage server of claim 7, wherein said computer readable program code to effect providing an error signal further comprises a series of computer readable program steps to effect providing an error signal by said error handling module to a support center.

9. The storage server of claim 8, wherein said storage server comprises a virtual tape server in communication with a plurality of tape drive devices.

10. The storage server of claim 9, wherein:
said storage server is in communication with a plurality of host computers;
each host computer comprises a data management system.

11. The storage server of claim 7, further comprising a default waiting period encoded in said computer readable medium, the computer readable program code comprising a series of computer readable program steps to effect:
setting a reporting delay interval equal to said default waiting period;
determining if a time interval since detecting said error exceeds said reporting delay interval;
operative if a time interval since detecting said error exceeds said reporting delay interval, providing said error signal even if said error handling module completing signal has not been received.

12. The storage server of claim 11, wherein said error handling module comprises a database associating each of a plurality of application errors with a specific error data management module response interval, said computer readable program code further comprising a series of computer readable program steps to effect:
operative if said error handling database associates a specific error data management module response interval with said detected error, setting said reporting delay interval equal to said specific error data management module response interval.

13. The storage server of claim 7, wherein said diagnostic data generating module comprises a database associating each of a plurality of application errors with a specific data collection script, said computer readable program code further comprising a series of computer readable program steps to effect:
determining if said diagnostic data generating module database associates a specific data collection script with said detected error;
operative if said diagnostic data generating module database associates a specific data collection script with said detected error, invoking said specific data collection script;
gathering diagnostic data recited in said specific data collection script.

14. The storage server of claim 13, said computer readable program code further comprising a series of computer readable program steps to effect storing said gathered diagnostic data at a storage location designated by said specific diagnostic data collection script.

15. The storage server of claim 14, said computer readable program code further comprising a series of computer readable program steps to effect:
determining if all the diagnostic data recited in said specific data collection script has been collected and saved;
operative if all the diagnostic data recited in said specific data collection script has been collected and saved, providing said completion signal to said error handling module.

* * * * *